United States Patent [19]

Hoffman, Jr.

[11] 3,868,560

[45] Feb. 25, 1975

[54] CAPACITIVE VOLTAGE REDUCER

[75] Inventor: Harry S. Hoffman, Jr., Saugerties, N.Y.

[73] Assignee: International Business Machines Corporation, Armonk, N.Y.

[22] Filed: Dec. 17, 1973

[21] Appl. No.: 425,386

[52] U.S. Cl. .......................... 321/2, 307/109, 320/1

[51] Int. Cl. .......................................... H02m 3/14

[58] Field of Search ....... 320/1; 321/2, 15; 307/109, 307/110, 150; 323/93

[56] References Cited

UNITED STATES PATENTS 3,274,475 9/1966 Poss ...................................... 320/1

OTHER PUBLICATIONS

Scientific & Technical Aerospace Reports, "Capacitive Divider," issue No. 9, pg. 1430, May 8, 1965.

RCA TN No. 241, "Voltage Reducing rectifier Circuit." by Scientific Library Jan. 5, 1959.

*Primary Examiner*—William H. Beha, Jr.
*Attorney, Agent, or Firm*—Douglas R. McKechnie

[57] ABSTRACT

Two different voltage reducers are disclosed that are each operable in two different modes dependent upon the order of application of timing signals. Both embodiments include a plurality of capacitors that under equilibrium conditions are alternately operated between charging and discharging between states of lower and higher charges. In both embodiments, each capacitor is charged from either the voltage source for the first capacitor in the series or from a preceding capacitor, and each capacitor is subsequently discharged to supply power to the load and to charge any subsequent capacitor.

16 Claims, 7 Drawing Figures

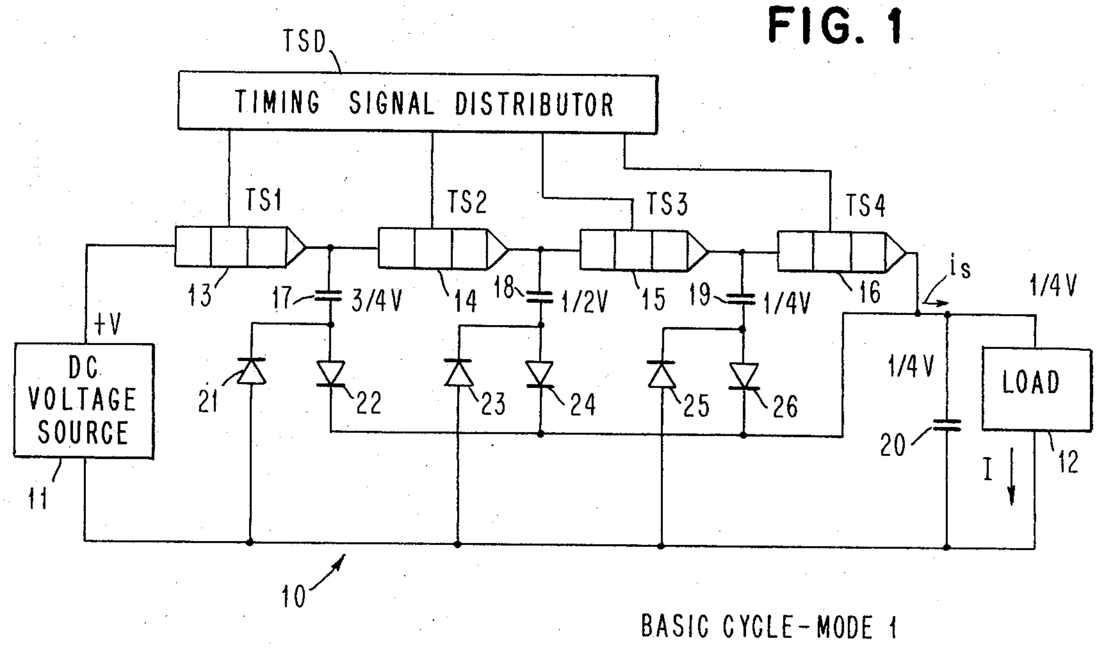
FIG. 2
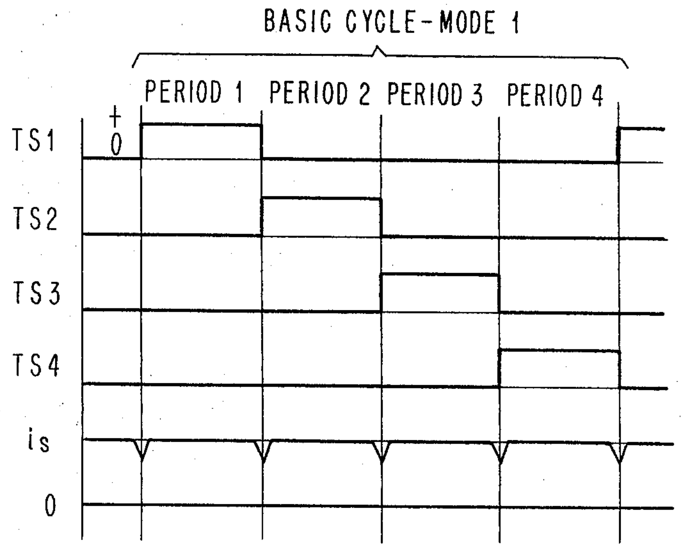
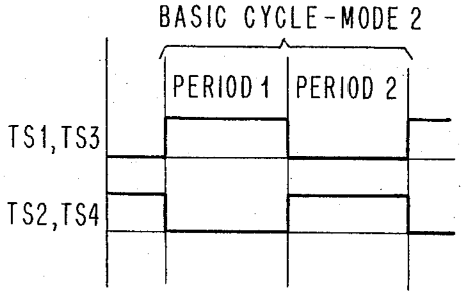
FIG. 3

CAPACITIVE VOLTAGE REDUCER

RELATED PATENT APPLICATION

Filed concurrently herewith is a related invention "Capacitive Based Voltage Reducer and Regulator," by H. S. Hoffman, Jr., Ser. No. 425,387, Filing date Dec. 17, 1973, and assigned to the assignee of the present application, the related application being directed to how the voltage reducers of the present application can be modified to provide a greater degree of voltage regulation.

BACKGROUND OF THE INVENTION

1. Field of the Invention

This invention relates to electronic voltage conversion circuits for converting a relatively high DC voltage to a relatively low DC voltage at a load. More particularly, it relates to voltage reducers of the type composed principally of capacitors, transistor switches and diodes of the type subject to implementation in large scale integrated circuit technology (LSI).

2. Prior Art

Currently, in the field of data processing, electronic digital computers are being implemented in LSI technology and contain thousands of circuits. The systems include power supplies that for efficiency provide a relatively high voltage that must be reduced and distributed to various circuits and networks throughout the system. One classic approach to voltage reduction is the use of transformers but, since transformers are not susceptible to being implemented through LSI technology, there has developed a need for transformerless voltage reducers. This need has been recognized in the prior art and the advantages of a capacitive based reducers have been recognized. In general, the prior art systems comprise a plurality of capacitors that are connected in series with the voltage source for charging and are then connected in parallel with each other and the load for discharging and supplying power to the load. Examples of such systems are disclosed in U.S. Pat. No. 3,708,742 — J. B. Gunn and U.S. Pat. No. 3,602,795 — J. B. Gunn. While the invention is disclosed in these patents has the same overall objectives, the manner in which the objectives or results are achieved differs from that of the subject invention primarily, first, in that the subject invention employs timing signals to control a voltage reduction whereas the patented inventions use the voltage across a capacitive element as the controlling factor and secondly, the subject invention supplies an essentially continuous even flow of current to the load.

SUMMARY OF THE INVENTION

The principal object of the invention is to provide a new and improved voltage reducer for supplying power to a load at a relatively low and constant DC voltage which power derives from a voltage source having a relatively high DC voltage.

Another object of the invention is to provide a capacitive based voltage reducer subject to implementation in LSI technology.

Still another object is to provide a voltage reducer that can regulate the voltage supplied to the load.

A further object is to provide a capacitive based voltage reducer employing a plurality of capacitors arranged so as to transfer energy from a source to a load with a minimum power loss.

Another object of the invention is to provide a relatively low cost voltage reducer which minimizes the voltage drop across any circuit device.

A further object is to minimize the required voltage ratings of the necessary switching and diode components.

Another object is to provide a voltage reducer which supplies an essentially continuous current flow to the load in such a manner as to minimize the value of an output capacitor in parallel with the load.

These and other objects, features and advantages of the invention will be apparent from the following more particular description of preferred embodiments of the invention as illustrated in the accompanying drawings.

BRIEF DESCRIPTION OF THE DRAWINGS

FIG. 1 is a circuit diagram of one embodiment of the invention;

FIGS. 2 and 3 are timing diagrams for operating the embodiment of FIG. 1 in two different modes;

DETAILED DESCRIPTION

Figure 4:
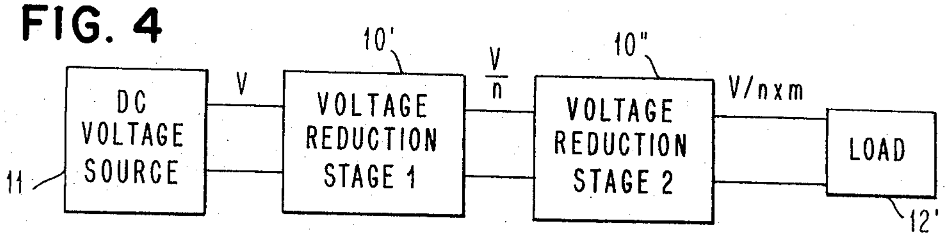
FIG. 4 is a block diagram showing how a series of voltage reducers can be arranged to provide staged voltage reduction.

Referring now to FIG. 1, a voltage reducer 10 is connected to a DC voltage source 11 and a load 12 and operates to supply the load with a reduced voltage ¼ v derived from voltage V supplied by source 11. Reducer 10 comprises a series of NPN transistors 13–16 that are operated as switches in response to the application to their bases of control or timing signals TS1–TS4. Except when used for the purpose of voltage regulation to be discussed in connection with FIG. 7, transistors 13–16 act as switches and will be hereinafter referred to as switches. Reducer 10 also includes capacitors 17–20 and diodes 21–26 connected as shown in FIG. 1.

A timing signal distributor TSD provides timing signals TS1–TS4 in either one of two modes so as to control or define the modes of operation of reducer 10. In the first mode, illustrated in FIG. 2, the basic cycle of the TSD is broken up into four periods and signals TS1–TS4 are separately and sequentially applied during different periods so as to actuate switches 13–16 sequentially and repetitively. In order to operate properly, it is necessary that one switch can be completely off before the next switch is turned on and thus the current is delivered to output capacitor 20 and may contain a series of downward spikes or glitches as shown in FIG. 2. To compensate for this and supply a continuous flow of current without glitches to load 12, capacitor 20 is connected across the load in parallel therewith and is charged to a nominal voltage the same as is delivered to the load. In the second mode shown in FIG. 3, the basic cycle has two periods. In the first period, timing signals TS1 and TS3 are applied to switches 13 and 15 while the other switches are off and in the second period, timing signals TS2 and TS4 are applied to actuate switches 14 and 16 while switches 13 and 15 are off. The operation of reducer 10 in each of these modes will now be described.

Operation of Reducer 10-First Mode

Assume that the input requirement of load 12 is to receive a substantially constant voltage ¼ V and current I. The operation of reducer 10 is dependent upon reaching an equilibrium condition when capacitors 17–20 are respectively charged to nominal voltages of ¾ V, ½ V, ¼ V and ¼ V. All voltage values assume ideal components with no losses. In an actual case, the earlier values would be slightly larger in order to provide an actual ¼ V at the load. During the course of operation, the capacitors will be charged and discharged between states of lower and higher charges. The relative capacitance of each of the capacitors is chosen so that the RC constant is relatively long in relationship to the duration of the timing signals or periods. Thus, the timing signal may be in the order of one one-hundredth of the RC constant in which case the amount of ripple associated with charging and discharging the capacitors between the two states is in the order of one-tenth of 1 percent so as to provide a relatively constant voltage level. However, it should be obvious that different time constants and voltage differences may be used depending on known considerations such as voltage rating and timing signal rate. At the start of operation, load 12 would receive a gradually increasing voltage until equilibrium is reached and inasmuch as the operation at equilibrium is the principal consideration, the description hereafter will be confined to the equilibrium operation.

During period 1, timing signal TS1 is active and switch 13 is on. This connects capacitor 17 in series with switch 13 and with the load so that current can be supplied thereto. During this period, the remaining switches are deactivated or off. Consequently, current is free to flow from the voltage source through capacitor 17 to charge it from a lower state to the higher state, through diode 22 which is now forward biased, and through load 12 back to source 11. Concurrently, a small amount of charge will flow to capacitor 20 to replace any charge previously lost. While switch 13 is on, the voltage V from source 11 is equal to the voltage drop across capacitor 17 of ¾ V and across the load of ¼ V. During period 2, switch 14 is on while the remaining switches are off. During this period, no power flows from voltage source 11 and capacitor 17 discharges from its higher state to its lower state causing a charge to flow from the upper plate as viewed in FIG. 1, through switch 14, capacitor 18, diode 24, the parallel combination of capacitor 20 and load 12 and back through diode 21 to the lower plate of capacitor 17. While current thus flows, capacitor 18 is charged from a lower state to a higher state.

In a manner similar to that described relative to period 2, a similar operation occurs during period 3 when switch 15 is now on. In this case, capacitor 18, which was charged on the previous cycle, is now discharged to charge capacitor 19 and 20 while delivering power to the load. During period 4, switch 16 is on and capacitor 19 discharges through switch 16, capacitor 20, load 12 and diode 25. The basic cycle then repeats itself.

With this mode of operation, there are several advantages. First, it should be noted that the maximum voltage drop across all switches and diodes is ¼ V and therefore lower cost elements could be used than would be the case if any had a higher voltage drop there across. Second, the maximum voltage differential between successive capacitors is also ¼ V and this effectively breaks down the power transfers so as to minimize any losses. Since the power loss connected with a capacitive device is a function of the square of a voltage differential, a series of smaller voltage drops between successive transfers involves less losses than fewer larger ones or even a single one. In addition, since diodes, capacitors and transistors are implementable in LSI technology, reducer 10 can be so implemented using any known conventional technique. It should also be obvious that the reducer 10 comprises a series of stages which can be varied according to the degree of voltage reduction desired. Source 11 acts as the power source for charging the first capacitor 17, and each capacitor in turn acts as the source of power for charging subsequent capacitors in the series. At the same time that a capacitor acts as a charging source, while it is discharging, it also supplies power to load 12. Moreover, the order of application of the timing signals can be made different and need not be sequential physically so long as the same order is repeated in each basic cycle.

Operation of Reducer 10-Second Mode

In this mode, the timing signals are applied to the switches so that half are on while the other half are off, and vice versa, during successive periods of the basic cycle. During period 1, capacitor 17 will be charged as before and power supplied to the load in series therewith. Concurrently, with switch 15 being on, capacitor 18 will concurrently discharge along the path previously described so as to charge capacitor 19 and also supply power to load 12. During the next period, switch 14 and 16 are on while 13 and 15 are off, and the capacitors, which were previously charging now discharge to supply power to the load and to charge capacitor 18. The advantage of this mode of operation is that it doubles the amount of power for a given rating switch because the voltage source 11 is connected to reducer 10 twice as much. However, it has a disadvantage in that when switches 13 and 15 are on, there is a voltage drop of ½ V across transistor or switch 14 and when switches 14 and 16 are on, there is a similar voltage drop across 15 of ½ V.

Referring now to FIG. 4, a plurality of reducers 10 can be connected in series to provide a plurality of voltage reducing stages. Voltage reduction stage 1 comprises a reducer 10′ similar to reducer 10 except that, for the purpose of illustration, it provides a voltage reduction of V/N. This reduction is then fed as an input to another voltage reducer 10″ that reduces the input voltage by a factor of 1/M where the output of reducer 10″ is applied to load 12′ that requires a voltage of V/n x m. It should be obvious that more voltage reduction stages can be added and that the current carrying capacity of the circuits would be the limiting factor. As the voltage is reduced, the current would rise, as is known in the art.

Second Embodiment

Figure 5:
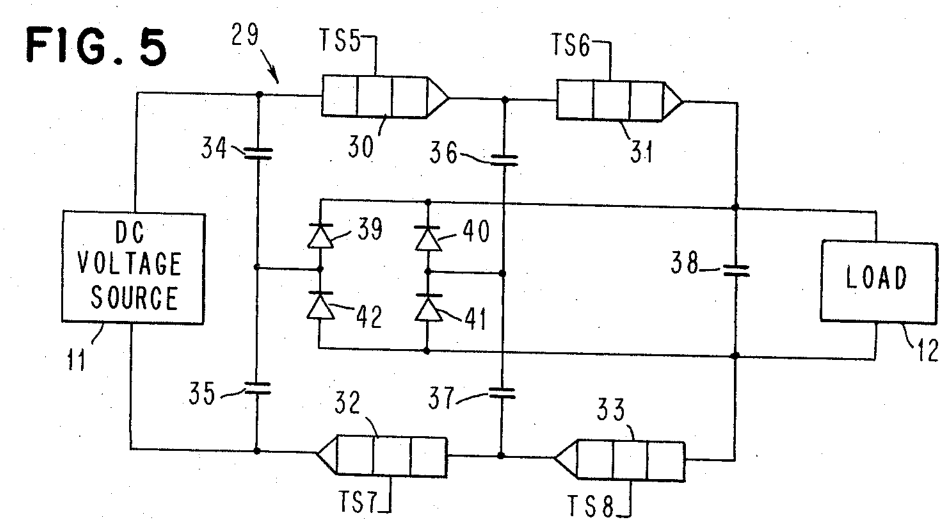
FIG. 5 is a circuit diagram of another embodiment of the invention.
Figure 6:
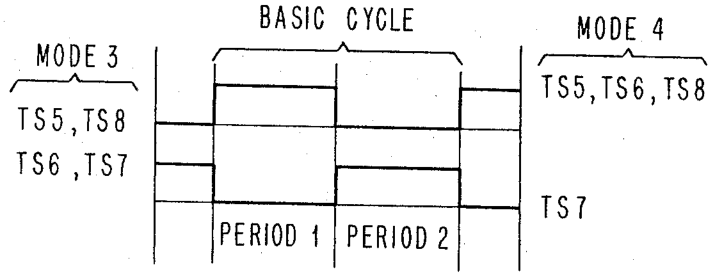
FIG. 6 is a timing diagram of the input timing signals for operating the embodiment of FIG. 5.

Referring now to FIG. 5, a voltage reducer 29 is connected to a source 11 and load 12 for the purpose of supplying to load 12 a reduced voltage derived from a relatively constant DC voltage of source 11. Reducer 29 comprises switches 30–33, capacitors 34–38 and diodes 39–42 connected as shown in FIG. 5. Reducer 29 is operable on either one of two modes dependent upon the order of the application of timing signals TS5–8 to the switches. For both modes, the basic cycle of operation is divided into two periods. For mode 3, timing signals TS5 and 8 are active while TS6 and 7 are inactive, and vice versa. Thus, switches 30 and 33 operate as a pair and are on while switches 31 and 32 are off and vice versa. In mode 4, as shown in FIG. 6, timing signals TS5, 6 and 8 are active while 7 is inactive in period 1, and TS7 is active in period 2 while the others are inactive. Consequently, in this mode, switches 30, 31 and 33 are on in period 1 and switch 32 is on in period 2. The operation in both of these modes will now be described.

Operation of Reducer 29-Mode 3

When reducer 29 is in operation an equilibrium is established, the nominal voltages to which the capacitors are charged are as follows:

| Capacitor | Voltage |
|---|---|
| 34 | ½ V |
| 35 | ½ V |
| 36 | ¼ V |
| 37 | ¼ V |
| 38 | ¼ V |

In reducer 29, capacitor 38 operates in a manner similar to capacitor 20 previously discussed, and is connected in parallel with load 12 to supply current to the load. During period 1 of mode 3, switch 30 is on. Half of the current flowing into the collector of switch 30 comes from source 11 and half comes from the discharge of capacitor 34. This current then flows through capacitor 36 to charge it from a state of lower to a state of higher charge, through diode 40, load 12, and diode 42. At this point, the current splits and half of it returns to the lower plate of capacitor 34 while the other half flows through capacitor 35 back to source 11 and in the process of flowing, charges capacitor 35. Concurrently, switch 33 is on and this connects capacitor 37 in parallel with a load for discharge therethrough. Current would flow from the upper plate of capacitor 37, through diode 40, load 12 and switch 33 back to the lower plate of capacitor 37. During this period, it is thus seen that the two capacitors 34 and 37 are discharging and capacitors 35 and 36 are charging. During period 2, with switches 32 and 31 being on, the reverse action occurs so that capacitors 35 and 36 discharge while capacitors 34 and 37 are charged. In this mode, it is seen that the power source 11 continuously supplies power through reducer 29 to the load and that mode 3 effects a reduction to ¼ V of the voltage V of the source. None of the transistors or diodes are exposed to more than ¼ V voltage drop there across.

Operation of Reducer 29-Mode 4

At equilibrium, the nominal voltages to which the capacitors are charged are as follows:

| Capacitor | Voltage |
|---|---|
| 34 | ⅓ V |
| 35 | ⅔ V |
| 36 | immaterial |
| 37 | ⅓ V |
| 38 | ⅓ V |

During period 1, switches 30, 31 and 33 are on. Current is supplied into the collector of switch 30 from source 11 and capacitor 34, as before and then flows through switch 31, load 12 and capacitor 38, and diode 42 to where the current splits to flow to the other half of capacitor 34 and through capacitor 35 to source 11. It is thus seen that capacitor 34 is placed in parallel with a load and has the same voltage drop while capacitor 35 is placed in series with the load for charging and has a voltage drop of ⅔ V. In this mode, the operation of capacitor 36 is immaterial and has no effect on the operation. If the only purpose of reducer 29 were to operate in mode 4, capacitor 36 could be eliminated. Also during period 1, switch 33 is on and this places capacitor 37 in parallel with the load for discharge therethrough along the path previously described.

During period 2 of the basic cycle, only switch 32 is on and this allows capacitor 35 to discharge from the upper plate of 35, through diode 39, capacitor 38 and load 12, diode 41, capacitor 37, switch 32 back to the lower plate of capacitor 35. At the same time, some current flows from source 11 to charge capacitor 34. In other words, the current flow path due to switch 32 being on is the same in both modes 3 and 4.

Voltage Regulation

Figure 7:
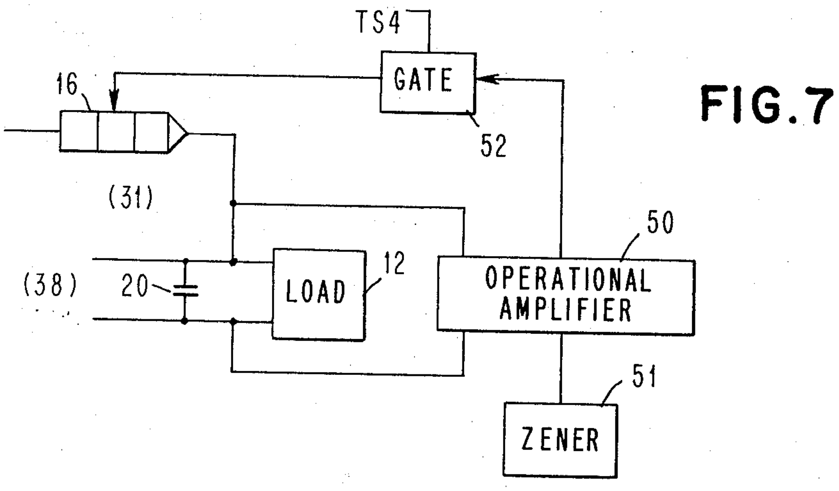
FIG. 7 shows how the embodiments of FIGS. 1 and 5 can be modified to provide further voltage regulation.

In both embodiments described above, there is an inherent degree of voltage regulation to the extent that as the impedance of the load changes, the degree of charging or discharging by the capacitors also changes to compensate for the load variations. Both embodiments can be modified, as shown in FIG. 7, to achieve a greater degree of voltage regulation. As shown, an operational amplifier 50 can be connected in parallel with the load to detect the voltage drop there across for comparison with a reference voltage such as supplied by a zener diode 51, the reference voltage being that which it is desired to maintain. The output of the operational amplifier 50 can then be fed to a gate 52. Timing signals TS4, for the first embodiment, or TS6, for the second embodiment, can be used to acutate gate 52 so as to pass the output of amplifier 50 to the base of transistor 16 or 31 which would now be operated as a class A amplifier. In this mode of operation, if the voltage across load 12 drops, the output of amplifier 50 during the period that the timing signal is active will cause the transistor 16 or 31 to be more conductive so as to have a lesser voltage drop there across and thereby offset the decreased voltage drop across the load.

Variations

From the foregoing, it should be seen that two basic embodiments are described each of which is versatile and can be operated in a plurality of different modes dependent on the manner in which the timing signals are applied. It should be obvious that variations may be made in not only the manner in which the timing signals are applied but also in the circuits without departing from the scope of the invention. Several variations will now be described. First, the first embodiment can be operated in a manner similar to the fourth mode of the second embodiment to provide a voltage reduction of ⅓ V instead of ¼ V. This can be done by concurrently supplying the same timing signal to two adjacent switches, for example, TS3 could operate both switches 15 and 16, and eliminating the unused timing period 4 from the basic cycle. Second, for voltage regulation, any of the transistor switches may be controlled by amplifier 50, it not being essential that it be the one closest to the load. Third, more or less stages can be used in each embodiment dependent on the degree of voltage reduction desired. Fourth, PNP transistors could be used instead of NPN and this would require obvious circuit changes to work with essentially reversed polarity from that shown. It is not intended that these variations be considered limiting inasmuch as it would be apparent to those skilled in the art that other variations and changes are also possible.

While the invention has been particularly shown and described with reference to preferred embodiments thereof, it will be understood by those skilled in the art that the above and other changes in form and details may be made therein without departing from the spirit and scope of the invention.

What is claimed is:

1. In a voltage reducer for supplying power at a relatively low and constant voltage V to a load which power is derived from a high voltage source, the combination comprising:

a series of capacitors including a first capacitor charged under equilibrium operating conditions to a nominal voltage V and a second capacitor charged under equilibrium operating conditions to a nominal voltage 2V;

periodically operated first circuit means connecting said second capacitor in series with said first capacitor and said load to thereby discharge said second capacitor during periods of operation of said first circuit means and thereby supply energy to said load for use thereby and to said first capacitor to make-up energy transferred therefrom in periods other than during operation of said first circuit means;

and periodically operated second circuit means connecting said first capacitor in series with said load to discharge said first capacitor, during periods of operation of said circuit means, through said load;

and periodically operated third circuit means connecting said second capacitor to receive power, during periods other than during the periods of operation of said first circuit means to make up for power transferred therefrom during operation of said first circuit means.

2. The combination of claim 1 including:

a further capacitor connected to said third circuit means, to supply said power to said second capacitor.

3. The combination of claim 2 comprising:

periodically operated fourth circuit means for charging said third capacitor and supplying power to said load;

all of said circuits means being operated in different periods repetitively and in the same order.

4. The combination of claim 1 wherein said first and second circuit means operate during alternate successive periods and said third circuit means operates concurrently during the periods of operation of said second circuit means.

5. The combination of claim 1 wherein:

each of said circuit means comprises a selectively actuated switch for controlling the operation thereof.

6. The combination of claim 5 wherein:

at least one switch comprises a selectively controllable transistor, and said combination further comprises regulating feedback means responsive to the voltage drop across said load to control the operation of said transistor so as to vary its conductance to offset changes in the voltage drop across said load, whereby to provide voltage regulation.

7. The combination of claim 1 comprising:

an output capacitor connected in parallel with said load for supplying current thereto between periods of operation of said circuit means.

8. In a power supply for supplying a low DC voltage to a load which power is derived from a power source providing a high DC voltage, comprising:

a plurality of stages connected to said source and load including at least one preceding stage and one succeeding stage; said preceding stage comprising:

First capacitor means;

and first circuit means including selectively actuated first switch means for connecting said first capacitor means in series with said load, said first circuit means being operative when said first switch means is actuated to supply current to said load at said low DC voltage and to charge said first capacitor means from a state of lesser charge to a state of greater charge;

said succeeding stage comprising:

second capacitor means, second circuit means including selectively actuated second switch means for connecting said second capacitor means in series with said first capacitor means and said load, said second circuit means being operative, when said second switch means is actuated and said first switch means is deactuated, to supply current to said load at said low DC voltage and to charge said second capacitor means with power derived from said first capacitor means, and third circuit means including selectively actuated third switch means for connecting said second capacitor means in series with said load to supply power thereto when said third switch means is actuated.

9. In a voltage reducer for supplying low voltage DC to a load which is derived from a high voltage source, the combination of:

first and second capacitor means;

first circuit means including selectively operated first switch means for concurrently charging said first capacitor means and discharging said second capacitor means to thereby supply power to said load;

second circuit means including selectively operated second switch means for concurrently charging said second capacitor means and discharging said first capacitor means to thereby supply power to said load;

and switch operating means for alternately operating said first and second switch means to thereby cyclically charge and discharge each capacitor means while continuously supplying power to said load.

10. The combination of claim 9 wherein:

each of said capacitor means comprises a plurality of capacitors.

11. A voltage reducer for receiving power from a power source providing a relatively high and constant DC voltage and supplying power continuously to a load at a relatively low voltage, comprising:

first and second capacitor means;

first circuit means including selectively actuated first switch means for connecting said first capacitor means in series with said source and load and operative, when said first switch means is actuated, to deliver power to said load for use thereby and to said first capacitor means for charging thereof from a state of lower charge to a state of higher charge;

second circuit means including selectively actuated second switch means for connecting said second capacitor in series with said first capacitor and load and operative, when said second switch means is actuated, to discharge said first capacitor means from said higher to said lower charge states and deliver power to said load for use thereby and to said second capacitor means for charging thereof from a lower state to a higher state;

third circuit means including selectively actuated third switch means for connecting said second capacitor means in series with said load and operative, when said third switch means is actuated, to discharge said second capacitor means from said higher state to said lower state and deliver power to said load;

and switch actuating means for repetitively and selectively actuating said first, second and third switch means.

12. The combination of claim 11 wherein:

each of said switch means is actuatable by means of a timing signal, and said switch actuating means is operative to supply timing signals for actuating said switches.

13. The combination of claim 12 wherein:

said switch actuating means is operative to supply a timing signal to only one of said switch means at a time.

14. The combination of claim 11 comprising:

output capacitor means connected in parallel with said load and operative to supply power to said load between periods when said switch means are actuated.

15. The combination of claim 12 wherein:

said first and second switch means being connected in series with said load;

said first and second diode means comprise a pair of diodes connected in series across said load;

said first capacitor being connected between the common points between said switch means and said pair of diodes.

16. In a voltage reducer for receiving power from a power source supplying a relatively high DC voltage and supplying power to a load at a relatively low and constant voltage, the combination comprising:

first and second capacitors;

first circuit means including selectively actuated first switch means and first diode means connected in series with said first capacitor and said load and operative, when said first switch means is actuated, to supply power to said load and to charge said first capacitor;

second circuit means including selectively actuated second switch means and second diode means connecting said first capacitor with said load and operative, when said second switch means is actuated, to discharge said first capacitor and thereby supply power to said load;

said second circuit means being operative to further connect said second capacitor with said load whereby said second capacitor is charged when said second switch means is actuated;

means for repetitively actuating said first and second switch means whereby when one is actuated the other is deactuated and third circuit means including selectively actuated third switch means operative, when actuated, to connect said second capacitor with said load to thereby discharge said second capacitor and supply power to said load.

* * * * *